(12) United States Patent
Stipe

(10) Patent No.: US 7,236,332 B2
(45) Date of Patent: Jun. 26, 2007

(54) THERMALLY ASSISTED RECORDING OF MAGNETIC USING AN IN-GAP OPTICAL RESONANT CAVITY

(75) Inventor: Barry Cushing Stipe, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 426 days.

(21) Appl. No.: 10/971,855

(22) Filed: Oct. 22, 2004

(65) Prior Publication Data

US 2006/0090178 A1 Apr. 27, 2006

(51) Int. Cl.
G11B 11/00 (2006.01)
(52) U.S. Cl. .................................. 360/317; 360/128
(58) Field of Classification Search ................ 360/317, 360/243.3, 59; 369/13.05, 13.32, 124.01
See application file for complete search history.

(56) References Cited

U.S. PATENT DOCUMENTS

| | | | |
|---|---|---|---|
| 2003/0128452 A1* | 7/2003 | McDaniel et al. | 360/59 |
| 2003/0184903 A1 | 10/2003 | Challener | 360/59 |
| 2003/0193117 A1* | 10/2003 | Schreiner et al. | 264/400 |
| 2004/0001420 A1 | 1/2004 | Challener | 369/112.27 |
| 2004/0008591 A1 | 1/2004 | Johns et al. | 369/13.14 |
| 2004/0062152 A1* | 4/2004 | Stancil et al. | 369/13.05 |
| 2004/0062503 A1 | 4/2004 | Challener | 385/129 |
| 2006/0067001 A1* | 3/2006 | Hsu et al. | 360/234.3 |
| 2006/0164960 A1* | 7/2006 | Poon et al. | 369/124.01 |
| 2006/0233061 A1* | 10/2006 | Rausch et al. | 369/13.32 |

OTHER PUBLICATIONS

"Klystrons and Microwave Triodes", by Donald R. Hamilton, et al., 1964.
Spectrochimica Acta, vol. 31B, pp. 483 to 486, "A cavity for microwave-induced plasmas operated in helium and argon at atmospheric pressure", Jun. 1976.
Journal of Applied Physics (Received Jul. 17, 1937), "A Type of Electrical Resonator", by W. W. Hansen.
Journal of Lightwave Technology, vol. 22, No. 3, Mar. 2004, "Optical Spotsize Converter Using Narrow Laterally Tapered Waveguide for Planar Lightwave Circuits", by Takayuki Mizuno et al.

(Continued)

Primary Examiner—Tianjie Chen
(74) Attorney, Agent, or Firm—Robert O. Guillot; Intellectual Property Law Offices

(57) ABSTRACT

A magnetic head including a media heating device that is fabricated within the magnetic head structure. The media heating device is fabricated between the writing magnetic pole of a perpendicular magnetic head and the ABS surface of the head, where it serves to heat the magnetic media during the passage of the magnetic media beneath the writing magnetic pole of the magnetic head. The media heating device includes an optical cavity resonator that can produce a high intensity near-field optical spot of subwavelength dimension at the write pole that is appropriate for perpendicular recording at 1 Tbits/in$^2$ and beyond. Optical energy is coupled into the resonant cavity through a waveguide that is placed proximate the cavity, and optical energy is coupled out of the cavity through a post that is placed within the cavity.

35 Claims, 5 Drawing Sheets

OTHER PUBLICATIONS

"High quality-factor whispering-gallery mode in the photonic crystal hexagonal disk cavity", by Han-Youl Ryu and Masaya Notomi, NTT Basic Research Laboratories, Apr. 19, 2004, vol. 12, No. 8, Optics Express 1708.

"Losses in single-mode silicon-on-insulator strip waveguides and bends", by Yurii A. Vlasov and Sharee J. McNab, IBM T.J. Watson Research Center, Apr. 19, 2004, vol. 12, No. 8, Optics Express 1622.

"Fields and Waves in Communication Electronics", Second Edition.

"Coupled re-entrant cavity system for electromagnetic levitation" by A.J. Sangster et al., Jul. 1999.

Physical Review Letters, vol. 91, No. 4, Jul. 25, 2003, "Ideality in a Fiber-Taper-Coupled Microresonant System For Application to Cavity quantum Electrodynamics" by S.M. Spillane et al.

Journal of Modern Optics, 2003, vol. 50, No. 15-17, 2543-2550, "Nanofabrication of optical strcutres and devices for photonics and biophotonics".

Nature, vol. 424, Aug. 14, 2003, "Optical Microcavities" by Kerry J. Vahala.

"Mode field patterns and preferential mode coupling in planar waveguide-coupled square microcavities" by Chung Yan Fong and Andrew W. Poon, Nov. 3, 2003, vol. 11, No. 22, Optics Express 2897.

"SiON high-refractive-index waveguide and planar lightwave circuits", by G.L. Bona et al., IBM J. Res. & Dev., vol. 47, No. 2/3, Mar./May 2003.

"Antiresonant reflecting optical waveguides in $SiO_2$ -Si multilayer structures", by M.A. Duguay et al., Appl. Phys. Lett. 49(1), Jul. 7, 1986.

"Reference Data for Engineers: Radio, Electronics, Computer, and Communications", by Mac E. Van Valkenburg et al., Newnes, 2001.

Optics Letters, vol. 28, No. 15, Aug. 1, 2003, "Ultrahigh light transmission through a C-shaped nanoaperture", by Xiolei Shi et al.

"Kesonant-enhanced evanescent-wave fluorescence biosensing with cylinderical optical cavities", by Steve Blair and Yan Chen, Applied Optics, vol. 40, No. 4, Feb. 1, 2001.

Journal of Lightwave Technology, vol. 15, No. 11, Nov. 1997, "FDTD Microcavity Simulations: Design and Experimental Realization of Waveguide-Coupled Single-Mode Ring and Whispering-Gallery-Mode Disk Resonators", S.C. Hagness et al.

Robert G. Hunsperger, Integrated Optics: Theory and Technology, no date.

* cited by examiner

THERMALLY ASSISTED RECORDING OF MAGNETIC USING AN IN-GAP OPTICAL RESONANT CAVITY

BACKGROUND OF THE INVENTION

1. Field of the Invention

The present invention relates generally to magnetic heads that are utilized with thin film hard disk data storage devices, and more particularly to the design and fabrication of a magnetic head having an optical energy resonant cavity storage media heating device formed therein.

2. Description of the Prior Art

Hard disk drives generally include one or more rotatable data storage disks having a magnetic data storage layer formed thereon. Data in the form of small magnetized areas, termed magnetic data bits, are written onto the magnetic layers of the disks by a magnetic head that includes magnetic poles through which magnetic flux is caused to flow. Magnetic flux flowing from a pole tip portion of the magnetic poles in close proximity to the magnetic layer on the disk, causes the formation of the magnetic bits within the magnetic layer.

The continual quest for higher data recording densities of the magnetic media demands smaller magnetic data bit cells, in which the volume of recording material (grains) in the cells is decreased and/or the coercivity (Hc) is increased. When the bit cell size is sufficiently reduced, the problem of the superparamagnetic limit will provide a physical limit of the magnetic recording areal density. Present methods to delay the onset of this limit in storage media include the use of higher magnetic moment materials, and using thermally assisted recording heads. The present invention relates to such thermally assisted recording heads in which a heating device is disposed within the magnetic head. Heat from the heating device temporarily reduces the localized coercivity of the magnetic media, such that the magnetic head is able to record data bits within the media. Once the disk returns to ambient temperature, the very high coercivity of the magnetic media provides the bit stability necessary for the recorded data disk.

Thermally assisted recording (TAR) is potentially a powerful technique in advancing magnetic recording to the 1 Tbit/in$^2$ range and beyond, and a promising technique includes the use of optical energy from the magnetic head to heat the media as it passes beneath the head. However, in using optical energy for the heating of the magnetic medium, one needs to consider the applicability of the optics in near field, e.g., 1 to 20 nm from the source which resides in the magnetic head slider, and the heating of an area in the medium of very small dimensions, e.g., in the 20 to 30 nm range. Conventional diffraction limited optics is not applicable for such a small area. Recently, descriptions of several TAR methods for near-field heating of media have been published. In published U.S. patent applications US2003/0184903 A1 and US2004/0008591 A1 special ridged waveguides used as high transmission apertures disposed within the magnetic head are taught for applications in perpendicular recording. In one example, a ridged waveguide is located immediately downtrack of the write pole such that the input plane of the ridged waveguide is parallel to the air bearing surface (ABS). In published U.S. patent applications US2004/0001420 A1 and US2004/0062503 A1 a planar waveguide is constructed on the downtrack side of the write pole. In this respect the heated spot is displaced downtrack of the write pole by the thickness of a cladding of the waveguide. In general the size of the heated spot depends on the optical wavelength and the dimensions and the composition of the materials for the waveguide/ridged waveguide.

In order to understand the operation of an optical cavity resonator it is useful to first consider the resonance of a simple circular cylindrical cavity at microwave frequencies, i.e., the cavity is a hollow circular cylinder. In microwave electronics, a closed circular cylinder has well defined resonances represented by transverse magnetic $TM_{mnp}$ modes and transverse electric $TE_{mnp}$ modes. The indices m, n, and p refer to the number of modes in the azimuthal, radial and longitudinal directions, respectively. For the present case, we limit our discussions to the fundamental mode, $TM_{010}$ i.e., there are no variations in the azimuthal and longitudinal directions. In this simple mode the magnetic field for $TM_{010}$ is concentric with the cylinder. On the other hand, the electric field is in the axial direction and has a maximum in the center of the cylinder. All its electric field lines span between the two side walls.

In an effort to increase the electric field in a circular cylindrical cavity, the reentrant cylindrical cavity resonator 12 shown in FIGS. 1A and 1B was developed for the generation of microwave power with klystrons and magnetrons. This cavity 12 is simply a circular cylindrical cavity with a coaxial post 16 which is shorter than the thickness of the cavity. The post extends from one side wall 20 and ends at a subwavelength distance, d, from the opposite side wall 24. An aperture 28, usually of subwavelength diameter, is placed in the side wall 24 opposite to the end of the post 16. The presence of the post 16 compounds the designation of the resonant modes. However, the cavity 12 is normally operated to resonate in a fundamental mode such that the electric and magnetic fields are axisymetric. Further, the electric field at the post remains parallel to the axis and peaks at or near the axis. Also, the magnetic field is perpendicular to the electric field such that its field lines are concentric circles about the axis. The presence of the post 16 intensifies the electric field at the axis because of the post to side wall separation, d, is now smaller than the thickness of the cylinder. Generally, the smaller the magnitude of d, the greater the axial electric field strength along the axis. What these experiments in the microwave regime have demonstrated is that a reentrant cylindrical cavity of subwavelength dimensions can produce very high intensity electric field in a direction normal to the face 24 of the cavity, a fact that is extended for near field thermal heating at optical wavelengths.

Since any modification to a resonant cavity, such as a post or an aperture, perturbs the simple TE and TM modes in the cavity, in the following we will refer to axial modes where the fields in the original, unmodified resonant cavity would be TM and will use in-plane to refer to fields which would have been TE in the unmodified resonant cavity. Thus for a circular cylindrical cavity, axial fields will imply that the electric field is predominantly oriented parallel to the axis of the cylinder and in-plane fields will imply that the electric field is predominantly perpendicular to the axis of the cylinder and thus in the plane of the air bearing surface.

An important consideration in using an optical resonant cavity for near-field heating is in coupling the optical power into the resonant cavity 12. A known technique in optical communication in coupling power into a cylindrical optical cavity is by way of evanescent-wave coupling from an integrated waveguide. As an example of this, R. W. Boyd et al., in Journal of Modern Optics, 2003, Vol. 50, No. 15–17, 2543–2550, "Nanofabrication of optical structures and devices for photonics and biophotonics" teaches a system consisting of a waveguide coupled to a resonant whispering gallery mode (WGM) cavity. The technique is schematically represented in FIGS. 2A and 2B where a tapered planar waveguide 40 is placed near a circular disk microcavity 44. The coupling can be effected if the waveguide 40 is placed with a gap 48 that is a fraction of a wavelength from the cavity. In this device the cavity and waveguide are comprised of a relatively high index of refraction material 50 such as GaAs that is surrounded by a relatively low index of refraction material, in this case air. The upper and lower surfaces of the waveguide and cavity are likewise bordered by layers 52 of relatively low index of refraction material, such as $Al_xGa_{1-x}As$, where x equals 0.4.

Much of the difficulty in applying near field optical devices for TAR lies in their incompatibility with the space-limited mechanical structure of the write poles within a magnetic head, the difficulty in bringing photons to such devices, and meeting the requirements for producing a near field high intensity optical spot that is within the magnetic field of the bit area that is being written.

SUMMARY OF THE INVENTION

An embodiment of a magnetic head of the present invention includes a media heating device that is fabricated within the magnetic head structure. The media heating device is preferably fabricated between the writing magnetic pole of a perpendicular magnetic head and the ABS surface of the head, where it serves to heat the magnetic media during the passage of the magnetic media beneath the writing magnetic pole of the magnetic head. The heating of the media lowers its localized coercivity, which facilitates the writing of data to the media.

A media heating device of the magnetic head of the present invention includes an optical cavity resonator that can produce a high intensity near-field optical spot of subwavelength dimension at the write pole that is appropriate for perpendicular recording at 1 $Tbits/in^2$ and beyond. Optical energy is coupled into the resonant cavity through a waveguide that is placed proximate the cavity, and optical energy is coupled out of the cavity through a post that is placed within the cavity.

It is an advantage of the magnetic head of the present invention that it includes an improved media heating element to facilitate the writing of data to a magnetic disk.

It is another advantage of the magnetic head of the present invention that it includes an improved heating element that is disposed such that the media is heated by the heating element during its passage below the writing pole of the magnetic head.

It is a further advantage of the magnetic head of the present invention that it includes a heating element that can be disposed coaxial with the writing pole of the magnetic head.

It is yet another advantage of the magnetic head of the present invention that it provides high efficiency coupling of light from a source into the media by means of a resonant cavity and specially designed coupling mechanism.

It is yet a further advantage of the magnetic head of the present invention that it provides a heated spot that is scalable as bit density increases beyond 1 $Tbits/in^2$.

It is an advantage of the hard disk drive of the present invention that it includes a magnetic head having an improved media heating element, whereby higher data areal storage densities of the hard disk drive can be obtained.

It is another advantage of the hard disk drive of the present invention that it includes a magnetic head having an improved media heating element, whereby data storage disks having a higher coercivity can be written upon.

It is a further advantage of the hard disk drive of the present invention that it includes a magnetic head that includes an improved media heating element to facilitate the writing of data to a magnetic disk.

It is yet another advantage of the hard disk drive of the present invention that it includes a magnetic head having an improved heating element that is disposed such that the media is heated by the heating element during its passage beneath the writing pole of the magnetic head.

It is yet a further advantage of the hard disk drive of the present invention that it includes a magnetic head of the present invention that it includes a heating element that can be disposed coaxial with the writing pole of the magnetic head.

It is still another advantage of the hard disk drive of the present invention that it includes a magnetic head having a heating element that it provides high efficiency coupling of light from a source into the media by means of a resonant cavity and specially designed coupling mechanism.

It is still a further advantage of the hard disk drive of the present invention that it includes a magnetic head having a heating element that provides a heated spot that is scalable as bit density increases beyond 1 $Tbits/in^2$.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

FIGS. 1A and 1B depict a microwave circular cylindrical reentrant cavity resonator of the prior art, wherein FIG. 1A is a top plan view and FIG. 1B is a side cross-sectional view taken along lines B—B of FIG. 1A;

FIGS. 2A and 2B depict a prior art system for coupling light from a source through a waveguide to a resonant cavity, wherein FIG. 2A is a top plan view and FIG. 2B is a side elevational view taken along lines B—B of FIG. 2A;

Figure 5A:
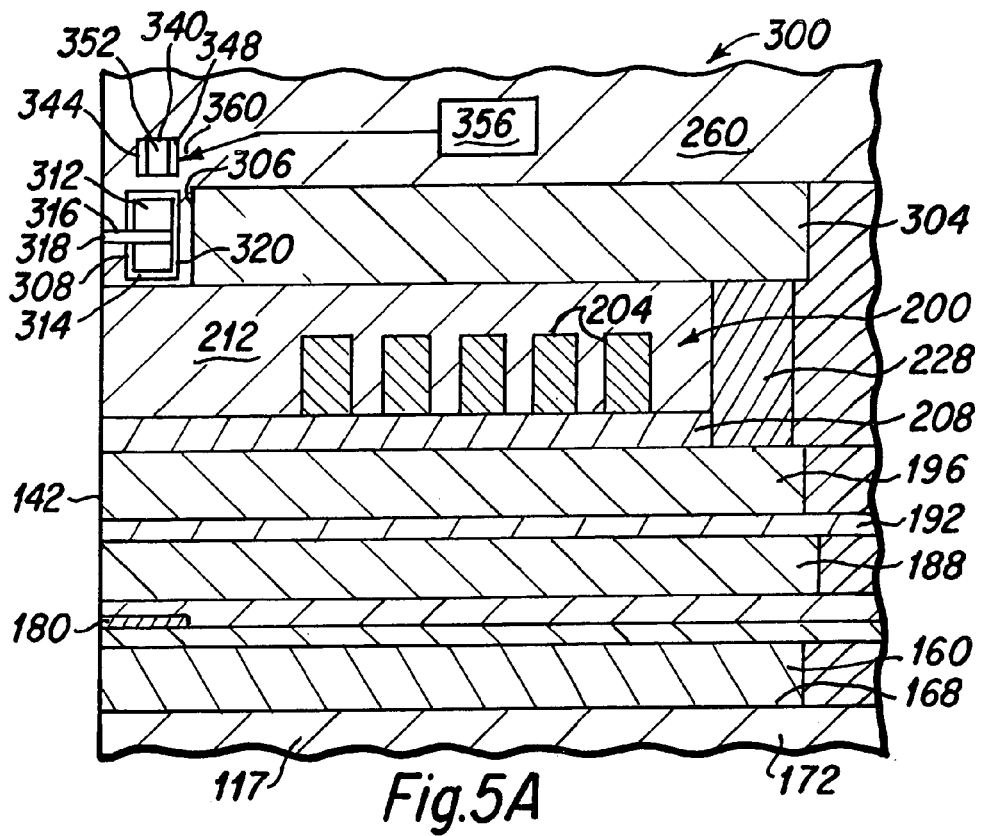
Figure 5B:
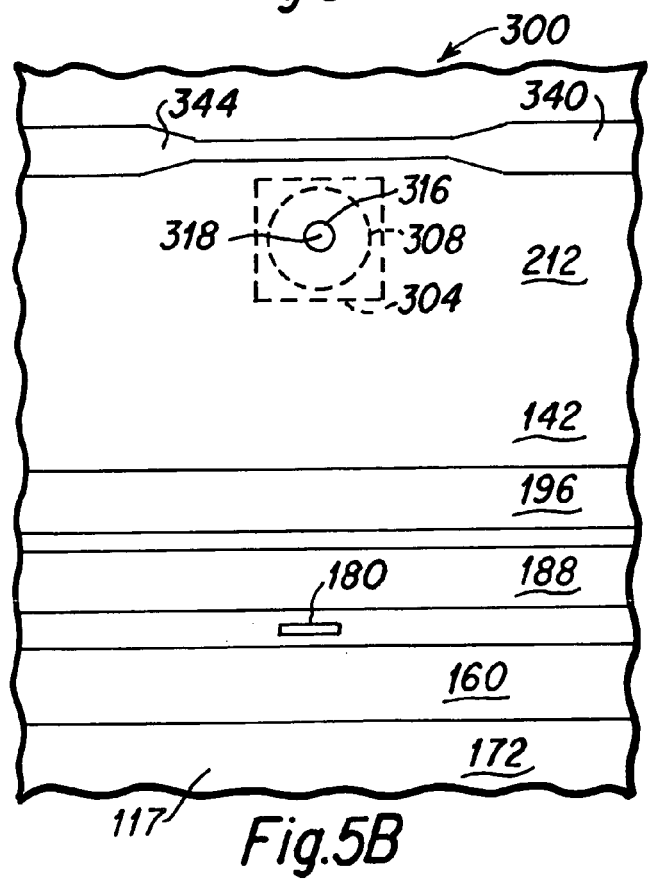
Figure 5C:
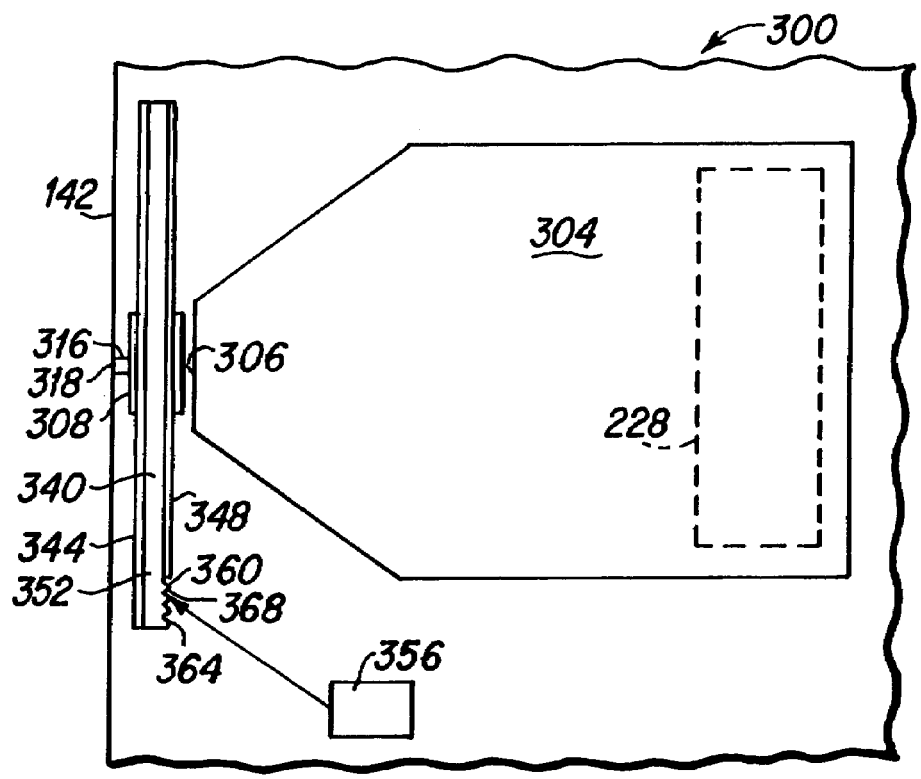
Figure 6A:
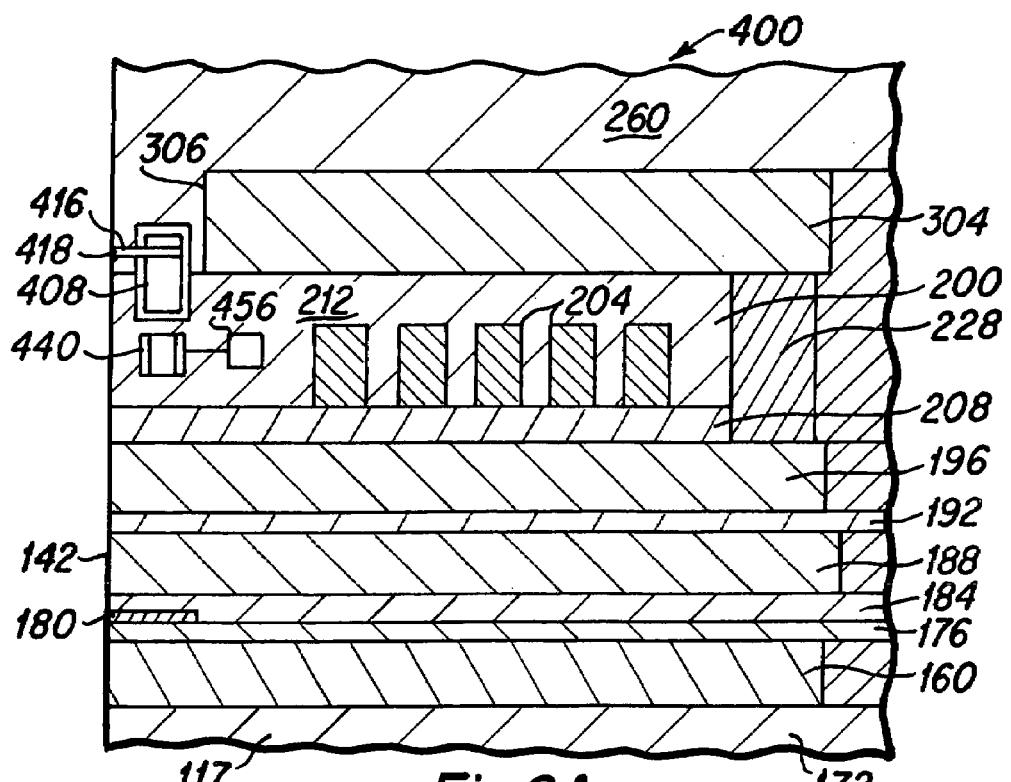
Figure 6B:
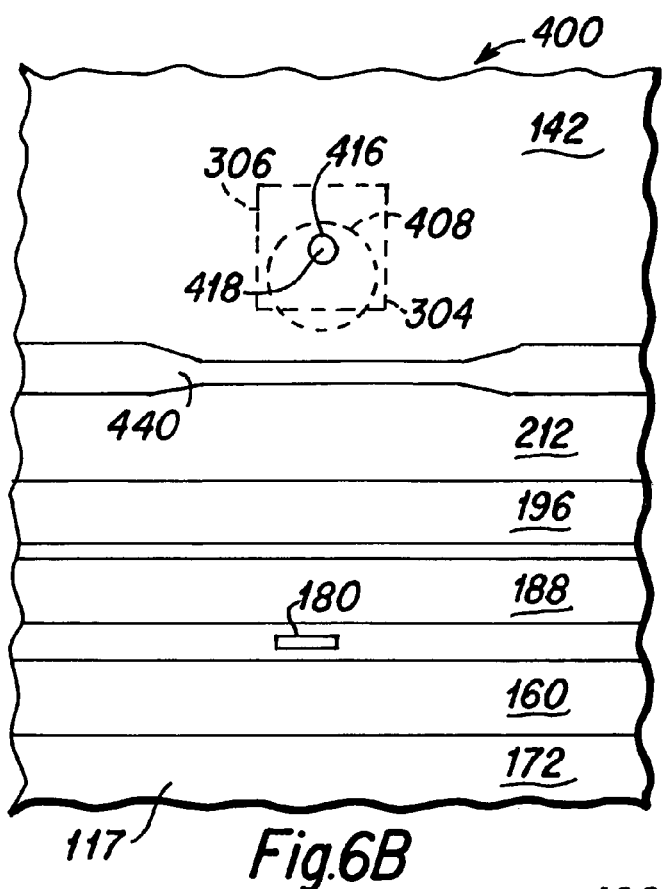
Figure 6C:
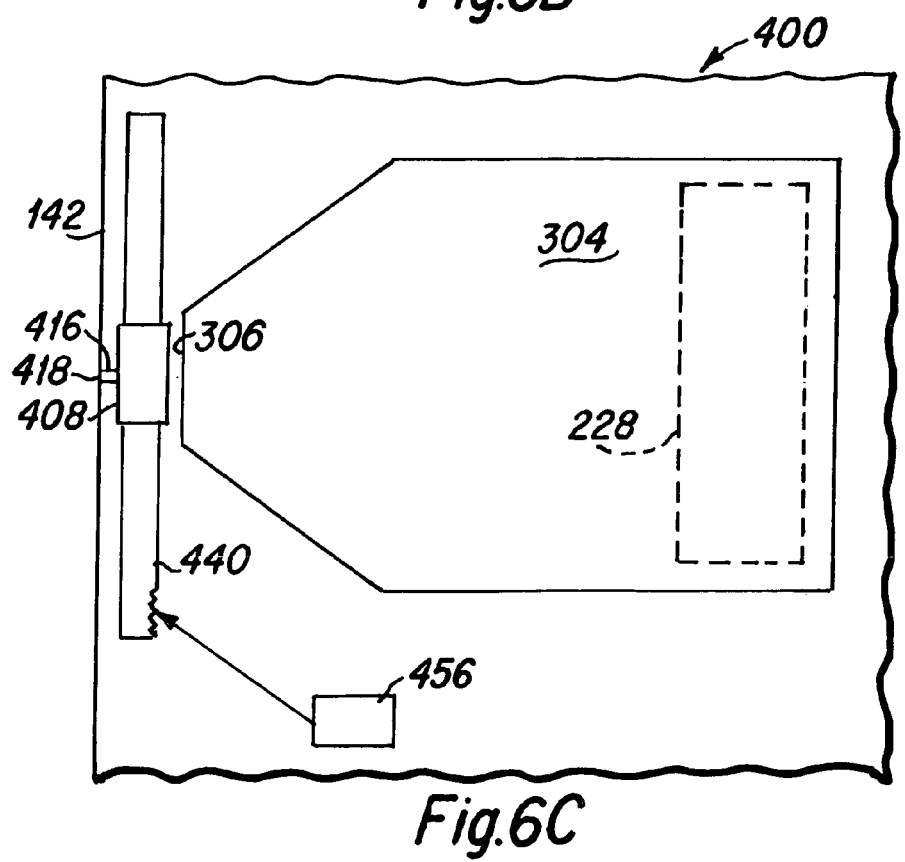

FIGS. 5A, 5B and 5C depict a first embodiment of a magnetic head of the present invention that includes an optical resonant cavity media heating device, wherein FIG. 5A is a cross-sectional view, FIG. 5B is a plan view taken from the ABS, and FIG. 5C is a plan view from the downtrack side; and FIGS. 6A, 6B and 6C depict another embodiment of a magnetic head of the present invention that includes an optical resonant cavity media heating device, wherein FIG. 6A is a cross-sectional view, FIG. 6B is a plan view taken from the ABS, and FIG. 6C is a plan view from the downtrack side.

DETAILED DESCRIPTION OF THE PREFERRED EMBODIMENTS

Figure 1A:
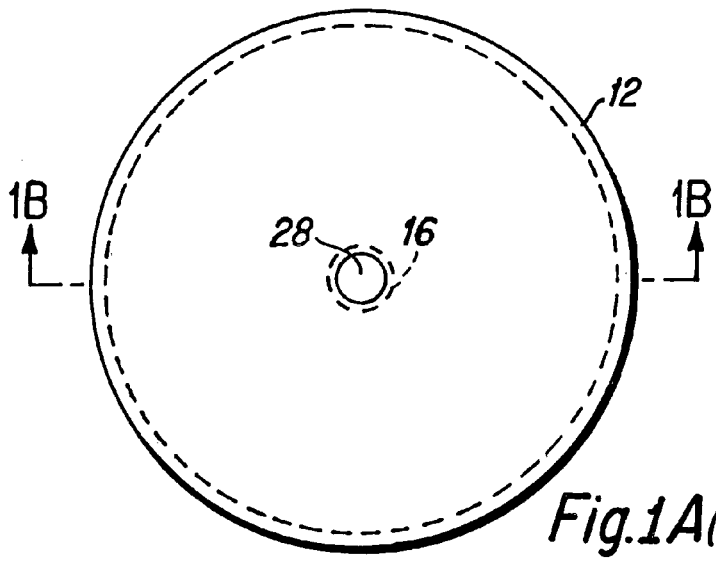
Figure 1B:
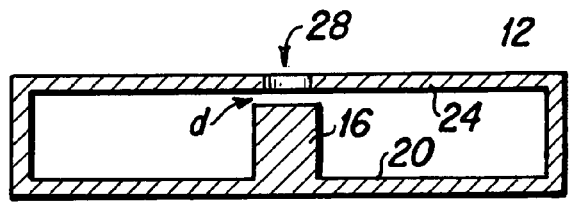
Figure 2A:
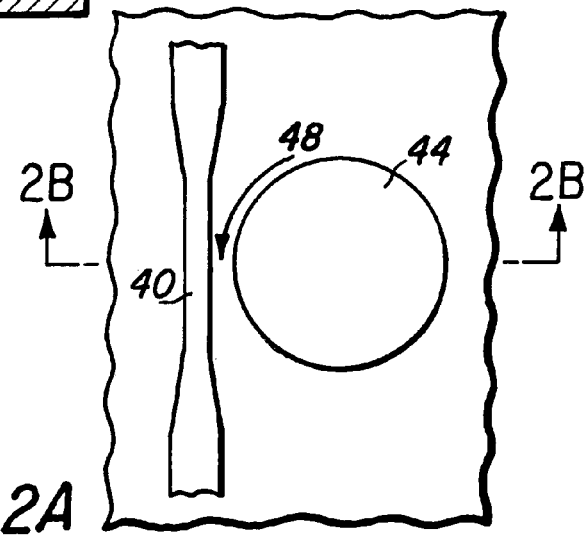
Figure 2B:
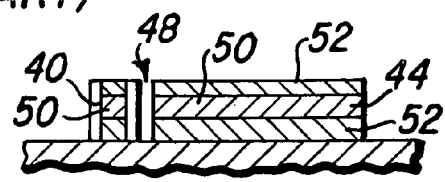
Figure 3:
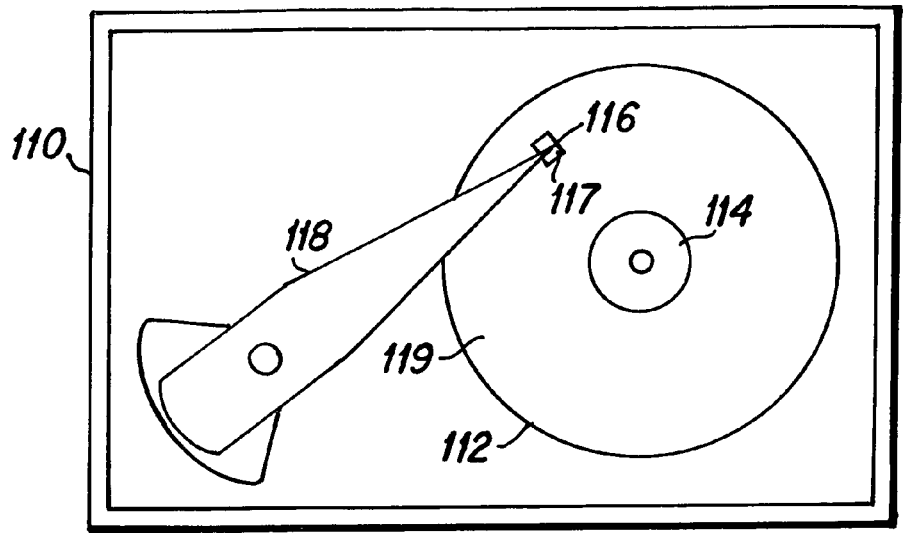
FIG. 3 is a schematic top plan view of a hard disk drive including a magnetic head of the present invention.

The magnetic head of the present invention is utilized to read and write data to magnetic media, such as a hard disk in a hard disk drive. A simplified top plan view of a hard disk drive 110 is presented in FIG. 3, wherein at least one magnetic media hard disk 112 is rotatably mounted upon a spindle 114. A magnetic head 116 of the present invention is formed upon a slider 117 that is mounted upon an actuator arm 118 to fly above the surface 119 of each rotating hard disk 112, as is well known to those skilled in the art. A typical hard disk drive 110 may include a plurality of disks 112 that are rotatably mounted upon the spindle 114, and a plurality of actuator arms 118, each having at least one slider 117 with a magnetic head 116 that is mounted upon the distal end of the actuator arms 118. As is well known to those skilled in the art, when the hard disk drive 110 is operated, the hard disk 112 rotates upon the spindle 114 and the slider acts as an air bearing in flying above the surface of the rotating disk. The slider 117 includes a substrate base upon which various layers and structures that form the magnetic head are fabricated. Such heads are fabricated in large quantities upon a wafer substrate and subsequently sliced into discrete magnetic heads 116.

Figure 4:
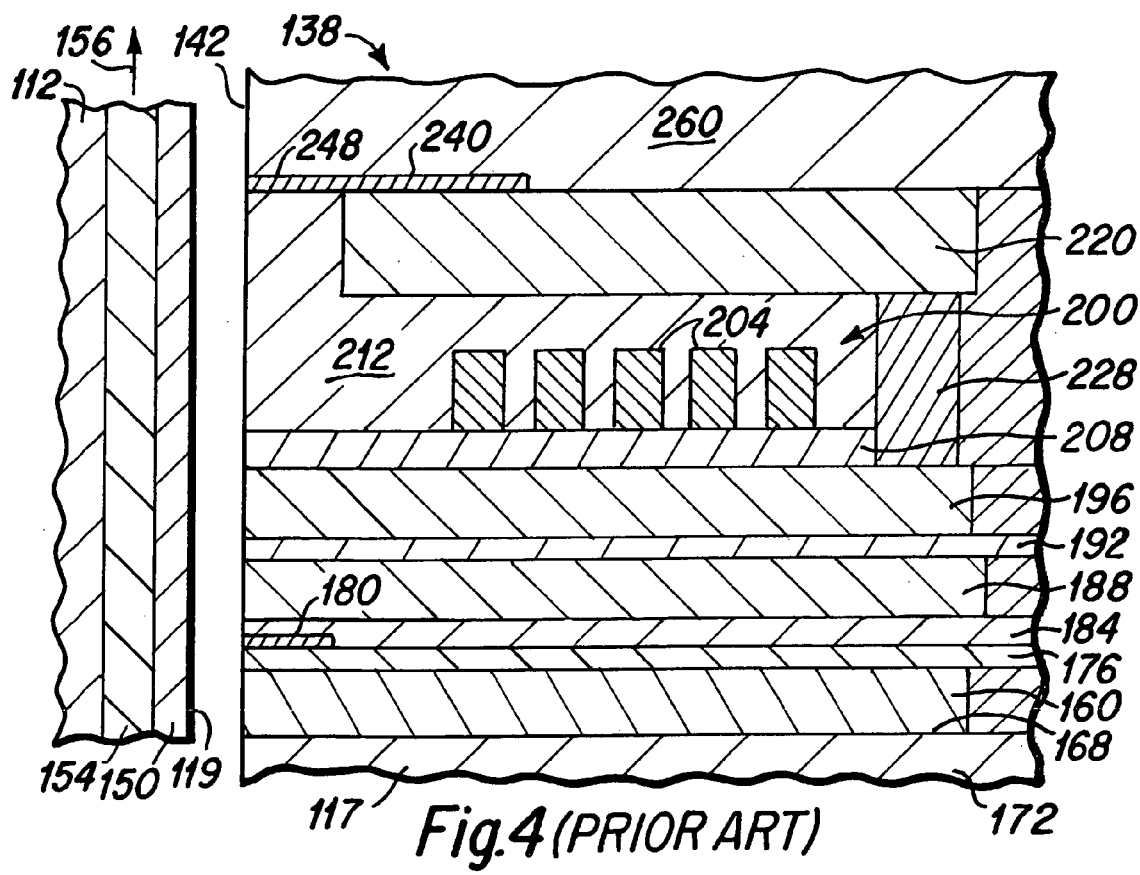
FIG. 4 is a side cross-sectional view depicting various components of a prior art perpendicular magnetic head.

FIG. 4 is a side cross-sectional diagram of a typical prior art perpendicular magnetic head 138 which serves as a basis for the description of an improved perpendicular write head of the present invention which follows. As depicted in FIG. 4, a slider 117 having an air bearing surface (ABS) 142 is shown in a data writing position above the surface 119 of a hard disk 112. The disk 112 includes a high coercivity magnetic layer 150 that is fabricated on top of a magnetically soft underlayer 154. In FIG. 4, the disk 112 is moving towards the top (arrow 156) relative to the stationary slider 117.

The perpendicular head 138 includes a first magnetic shield layer (S1) 160 that is formed upon the upper surface 168 of the slider substrate 172. A first insulation layer (G1) 176 is formed on the S1 shield 160 and a read head sensor element 180 is formed on the G1 layer 176. A second insulation layer (G2) 184 is formed on the sensor 180 and a second magnetic shield layer (S2) 188 is formed upon the G2 insulation layer 184. An electrical insulation layer 192 is then deposited upon the S2 shield 188, and a first magnetic pole (P1) 196 is fabricated upon the insulation layer 192. An induction coil structure 200 is fabricated upon the P1 pole 196, that includes induction coil turns 204 that are typically formed upon an electrical insulation layer 208 and within filling insulation 212. A second magnetic pole layer 220 typically termed a shaping layer or yoke 220, is fabricated on top of the induction coil structure 200. A magnetic back gap piece 228 joins the back portions of the P1 pole 196 and the shaping layer 220, such that magnetic flux can flow between them. A probe layer 240 including a narrow pole tip 248 is next fabricated in magnetic flux communication with the shaping layer 220. The pole tip dimensions determine the size of the data bits, such as the written track width.

Following the fabrication of the probe layer 240, further magnetic head fabrication steps, such as the fabrication of electrical interconnects (not shown), are accomplished, as are well known to those skilled in the art, and the magnetic head is subsequently encapsulated, such as with the deposition of an alumina layer 260. Thereafter, the wafer is sliced into rows of magnetic heads, and the ABS surface 142 of the heads is carefully polished and lapped and the discrete magnetic heads 138 are ultimately formed.

As is well understood by those skilled in the art, electrical current flowing through the induction coil 204 will cause magnetic flux to flow through the magnetic poles of the head, where the direction of magnetic flux flow depends upon the direction of the electrical current through the induction coil. For instance, current in one direction will cause magnetic flux to flow through the shaping layer 220 through the probe layer 240 and its narrow pole tip 248 into the high coercivity magnetic layer 150 of the hard disk 112. The shaping layer plus probe layer with its narrow pole tip is sometimes referred to as the writing pole of the magnetic head and the P1 pole is referred to as the return pole. The magnetic flux from the pole tip 248 causes magnetized data bits to be recorded in the high coercivity layer 150 as the disk moves past the magnetic head in direction 156, where the magnetization of the data bits is perpendicular to the surface 119 of the disk 112.

As indicated hereabove, to increase the areal data storage density of hard disk drives, the disks are fabricated with high coercivity magnetic media that can form and maintain smaller magnetic data bit cells. To write data to the high coercivity media it is helpful to include a media heating device within the magnetic head, such that the localized heating of the media reduces its coercivity and the magnetic head can then more easily and reliably write data bits into the heated magnetic media layer. Once the disk returns to ambient temperature the high coercivity of the magnetic media provides the bit stability necessary for the recorded data bit. As is described hereinbelow, the present invention includes magnetic heads having improved media heating devices that comprise optical resonant cavity systems for enabling thermally assisted recording for 1 Tbits/in$^2$ and beyond. A general discussion of such optical systems is next presented, followed by a detailed discussion of their implementation in the magnetic head embodiments of the present invention.

The resonant cavity optical system for a magnetic head consists of three separate elements which have to be designed to work together. The main component is a resonant cavity that provides high optical fields to improve coupling efficiencies. A means for bringing light from a laser source into the resonant cavity is also required; this is preferably a waveguide that is tapered and located close to the cavity in a manner to maximize coupling from the waveguide to the cavity. Finally, a means of coupling light from the cavity to the medium in a small, localized area on the order of 25 nm in diameter is needed. In this invention the microwave concepts described above are adapted to optical frequencies and applied to high density magnetic recording.

The goal of this invention is to produce a very strong optical field under the writing pole of a magnetic recording head using a resonant optical cavity. The cavity is generally circular cylindrical or a ring structure, although it may also be rectangular or a photonic crystal structure. The ring structure, in particular, can be of an elongated shape to form a racetrack-shaped ring structure. The field inside the cavity can be enhanced over the field used to feed the cavity by a large factor equal to the Q, or quality factor of the cavity. Q values of >1 are commonly quoted and values $10^5$–$10^9$ have been demonstrated in simulations. The large field enhancement in the cavity means larger fields can be delivered to the medium. The cavity is created as a dielectric material that is shaped to the desired cavity dimensions and disposed within the magnetic head, where the dielectric material is non-absorbing at the optical wavelengths used to excite the cavity. For a wavelength in the 1–2 μm range, silicon (Si) can be used as the cavity material. Cavities and waveguides can be integrated on a silicon-on-insulator (SOI) wafer, while other commonly used materials are silica-on-silicon and silicon oxy-nitride (SiON). Gallium arsenide and other III–V materials are also often used when sources (e.g. semiconductor lasers) or other active optical devices are integrated in the same structure, and they may also be incorporated within the present invention.

Light can be confined in the cavity by a number of well-known methods that all produce an interface that reflects the light. The simplest of these methods is an interface with a dielectric material of lower index of refraction as is used in step index optical fibers. Other methods include a reflective metal coating, a reflective dielectric thin film stack, a gradient index interface, an overlay of high index material, an overlay of a reflective grating, an anti-resonant reflective structure or a photonic crystal structure. For the purposes of this invention, dielectric interfaces will generally be the preferred method although metal interfaces may be used on the top and/or bottom faces to help confine the field that is coupled out of the cavity into the recording medium.

The dimensions of the cavity are determined by the wavelength of the light in the material, the confinement method and the cavity mode being used. For $TM_{010}$ mode in a silicon cylindrical cavity surrounded by air at a wavelength (in air) of 1.55 µm, the cavity diameter would be on the order of 340 nm. In order to assure only the lowest order modes are allowed in the axial direction, the cavity thickness should be less than $\lambda_{eff}/2$, where $\lambda_{eff}$ is the wavelength in the cavity. For the Si cavity at 1.55 µm, this means the thickness should be <220 nm. For this invention, higher order modes can also be employed. Whispering gallery modes (WGM), where there are a string of maxima around the periphery of the cylinder, may be used. In this case the cavity can be several microns in diameter.

As is discussed in detail herebelow, the cavity is built into the magnetic head with its axis normal to the air-bearing surface (ABS) and with one face of the cavity either at the ABS or close to it. If the cavity is formed at the ABS, the cavity face nearest the ABS may have a protective coating on it and may be covered with a lubricant. This invention calls for the cavity to be built between the writing magnetic pole of a perpendicular magnetic head and the ABS.

Given a resonant cavity, mechanisms are required to bring light into the cavity and then again to couple light out of the cavity and into the recording medium. In practice, these elements all need to be designed in conjunction with the cavity and the recording medium to optimize the overall performance, but they are next discussed separately for simplicity. In general, a semiconductor laser will be used as the light source, and this invention uses a waveguide to bring light from the source to the resonant cavity. Although not necessary, for simplicity the waveguide will in general be similar to the cavity in terms of the materials and film thicknesses used to fabricate it. Light from the laser can be coupled into the waveguide in a number of commonly known ways. If the laser and waveguide are on the same substrate, the laser can be directly butt-coupled into the waveguide with good efficiency. If not, a spot size reducer can be put on the end of the waveguide and the laser can be focused onto it, or a grating or prism coupler can be placed on the waveguide for coupling. When properly designed, all of these methods can have good coupling efficiency.

To couple light from the waveguide to the cavity, the waveguide is generally tapered down and brought into close proximity to the cavity. An example of a waveguide coupled to a resonant cavity with both on the same substrate is presented in R. W. Boyd et al., in Journal of Modern Optics, 2003, Vol. 50, No. 15–17, 2543–2550, "Nanofabrication of optical structures and devices for photonics and biophotonics". When properly designed, this coupling can be close to 100% efficient and the field intensity in the cavity will be larger than the field in the waveguide by a factor of Q.

Finally it is required to couple the light out of the cavity and into the recording medium. This can be done resonantly or non-resonantly. Since the cavity has very high fields internally, any non-resonant aperture or perturbation placed on the cavity will result in good field strength outside the cavity. As an example of this, Boyd et al. teaches placing a small absorbing particle on top of the cavity at the location of a field maximum, whereupon nearly 100% of the light from the waveguide is coupled through the cavity and out at the particle location, resulting in very strong fields at the particle. In the present invention, output coupling at a small localized area can be achieved by fabricating a post within the cavity at the location of a field maximum. It is important to realize that this is one area where the design of the output coupling mechanism is tightly bound to the design of the cavity and to the recording medium. Introducing a perturbation will alter the cavity resonance slightly as will the presence of the recording medium in the near field of the cavity. These effects have to be taken into consideration in the design. With proper design, the output coupling can also be done resonantly to maximize the overall coupling to the recording medium. An example of this is the microwave reentrant cavity described above where a metal post is placed in the cavity whose dimensions are chosen to achieve resonance. This greatly enhances the field at the output of the cavity.

A similar technique is employed for the optical cavity of the present invention by fabricating a metal post in the resonant cavity at the location of a field maximum as is discussed in detail herebelow. The post dimensions and shape are designed to achieve a resonance with the field in the cavity producing an intense electric field beneath the post. The post may be comprised of a metal pin and have a length such that a resonant charge oscillation (local plasmon) is generated in the metal pin. The lateral extent of the intense field is determined by the post diameter, and this post diameter can be much smaller than the wavelength used. In the microwave reentrant cavity example, the post diameter was between $0.14\lambda$ and $0.011\lambda$. For the optical case, using $\lambda=1.55$ µm and a silicon cavity, this would mean a post diameter of about 64 nm which is in the range for 1 Tbits/in$^2$ magnetic recording. This again assumes resonance conditions with axial electric fields.

The resonant cavity approach can also be used for in-plane fields. For axial fields, the preferred cavity is one with a post, as in the reentrant cavity. For in-plane fields either a cylindrical disk or race-track cavity can be used in either low order modes or WGM. These cavities can be used with either a simple aperture or a near-field aperture, where we define a near field aperture as one which has enhanced intensity in the near-field. Examples of this are ridged waveguides. A special type of ridged waveguide, the so-called C aperture, has been described by X. Shi and L. Hesselink in Journal of the Optical Society of America B, 2004, Vol. 21, No. 7, 1305–1317, "Design of a C aperture to achieve $\lambda/10$ resolution and resonant transmission". Combining the near-field aperture with the resonant cavity again multiplies its efficiency by providing very high fields behind the near-field aperture. Although the metal post is the preferred embodiment for this invention, any other resonant structure that produces a small localized field can be used. Two embodiments to illustrate the application of resonant cavities for thermally assisted magnetic recording are next discussed.

FIGS. 5A, 5B and 5C depict a first embodiment 300 of a magnetic head of the present invention, wherein FIG. 5A is a cross-sectional view, FIG. 5B is a plan view taken from the ABS, and FIG. 5C is a plan view from the downtrack side. Each of the embodiments 300 and 400 (described herebelow) of the present invention may serve as the magnetic head 116 within the hard disk drive 110 of the present invention, as described hereabove with reference to FIG. 3. As depicted in FIGS. 5A, 5B and 5C, the magnetic head embodiment 300 includes a first magnetic shield layer 160, a read head sensor element 180 and a second magnetic shield layer 188, as well as first magnetic pole 196 and the induction coil structure 200 within filling insulation 212 that are similar to the structures depicted in FIG. 4 and described above, whereby they are correspondingly numbered for ease of comprehension. A modified second magnetic pole, or writing pole, 304 is fabricated in magnetic connection with the back gap member 228 to the first magnetic pole 196. Unlike the prior art writing pole depicted in FIG. 4, the writing pole 304 does not reach to the ABS 142. Rather, the writing pole 304 terminates in a rather broad pole tip face 306 that is spaced back from the ABS 142.

A resonant optical cavity 308 is placed near the end of and coaxial with the pole tip 306, such that the cavity 308 is disposed between the pole tip 306 and the ABS 142. The cavity 308, consists of a dielectric material 312 of high index of refraction (e.g., silicon for 1–2 μm wavelength), that is fabricated in a matrix of another dielectric material 314 that has lower index of refraction (e.g., $SiO_2$), such that the electric fields are confined within the cavity. In the preferred embodiment, although it may not be required, the cavity 308 is recessed away from the ABS 142. This is done to distance it from the metallic hard disk 112 because a metal disk that is disposed in close proximity to the resonant cavity 308 may cause near-field coupling to occur between the cavity and the disk over a wide area. This would result in energy losses that will decrease the efficiency of the system and could lead to large area heating in the disk. The cavity 308 is also recessed from the ABS 142 due to a concern that optical energy from the cavity may leak from its edges towards the ABS, and placing the cavity away from the ABS will reduce this possible effect. It is optional whether the cavity is disposed at the ABS or inwardly from it, but it is preferred that it be disposed inwardly from the ABS.

A metal post 316 is fabricated within the cavity 308 to couple the output energy from the cavity. The post is located along the central axis of the cavity 308, and may be composed of a metallic material and have a length such that a resonant charge oscillation (local plasmon) is generated in the metal post. The post 316 is preferably formed from a metal such as silver, gold, aluminum, rhodium, platinum, chromium, among others. Similarly, the flat surfaces of the cavity may also have similar metal thin film. At resonance in a fundamental mode at the input wavelength, the cavity 308 creates very high electric field and evanescent waves that emanate at the post tip end 318 that are parallel to the post axis. The metal post is extended to the ABS to guarantee near-field coupling over a small area defined by the size of the tip 318 of the post. The output energy, with electric fields mainly normal to the ABS extends from the post tip 318 and down into the magnetic medium to produce thermal heating. The tip 318 of the post may be tapered to a smaller diameter, such that the post 316 has a thicker shaft that narrows to the tip, much like a pencil. The size of the post 316 can affect the resonant behavior of the cavity; thus, the cavity design is post-geometry specific. This means the post dimensions are selected to produce resonance for given required heated spot size. It is preferred to tune the length of the post to the frequency of the resonant cavity radiation in order to excite a local plasmon mode of the post. This can increase the efficiency of the optical system. The length of the post 316 is preferably roughly equal to the wavelength divided by two times the index of refraction of the cavity, as will be understood by those skilled in the art. It is important to note that a change in bit density of the hard disk drive 110 necessitates a change in post dimensions, or at least the pole tip dimensions, to create the reduced size data bits. In this respect, it is possible to rescale the cavity dimensions without loss of effectiveness in heating, since the post defines the location of maximum electric field and the location of the heated spot.

As is best seen in FIG. 5B, the surface area of a face 320 of the cavity is less than the surface area of the writing pole tip 306. Because the cavity area is small compared to the pole tip area, it is possible to locate the cavity directly between the pole tip 306 and the ABS 142. As a result, there is provided a strong perpendicular magnetic field that is co-located with the small intense heat spot from the post tip. In this situation, the magnetic field is uniform over a relatively large area and the size of the data bits is determined by the size of the thermal heat spot, rather than by a gradient in the magnetic field. That is, in conventional recording, transitions occur where the media coercivity and applied field are equal Hc=Ha. To have a sharp transition, the applied field gradient dHa/dx should be as large as possible where the transition is written. In the thermally assisted recording (TAR) of the present invention, the temperature gradient is equivalent to a coercivity gradient according to dHc/dx=(dHc/dT)(dT/dx) where dH is the change in media coercivity with temperature. This gradient is typically larger than the applied field gradients in conventional recording. Therefore, in the TAR of the present invention transitions occur at the trailed edge of the hot spot. To properly bias the media while it is being written, it is necessary to have a large applied field at the hot spot trailing edge. It is the gradient in the temperature that creates the change in the coercivity which results in the creation of the data bits. Therefore, the size of the data bits, and the track width of the magnetic head, is determined by the dimensions of the post tip 318 which creates the thermal heat spot.

For a fundamental mode with axial fields, the diameter of the cavity 308 is typically about 40% of the effective wavelength of the radiation, where the effective wavelength is defined as the ratio of the freespace wavelength to the index of refraction of the cavity material. For 1.55 μm waves in a silicon cavity, the cavity diameter is approximately 0.18 μm. The dimensions for the post tip 318 for 1 Tbit/in² would be of the order of 50 nm×75 nm. In this respect, the post tip 318 is 75 nm thick. Consequently, the ratio between the cavity diameter (0.18 μm) and the post diameter (75 nm) is 2.4. It is to be understood that these cavities can be designed for other wavelengths as is well known to those skilled in the art. Going to different wavelengths requires using compatible materials. As the wavelength and the materials change, the cavity dimensions will scale with the effective index.

In order to produce high efficiency coupling of light into the cavity 308, an optical waveguide 340, which may be tapered down 344 near the cavity, is placed in the vicinity of the cavity to provide the coupling. In FIG. 5B, a waveguide 340 is illustrated on the downtrack side of the cavity 308 and directed parallel to the ABS. Alternatively, the waveguide can be on the uptrack side of the cavity (not shown). The waveguide 340 is made of laminated thin film materials as illustrated in FIG. 5A and should be precisely spaced and integrated to the exterior of the cavity. The waveguide is preferably composed of three thin layers. The top and bottom layers 344 and 348 respectively are the "claddings" and can be either nonferrous metals or low index materials, and the center film 352 is the "core" which is a high index dielectric such as silicon. The waveguide needs to be in a matrix of dielectric material of low index of refraction, e.g., $SiO_2$.

Coupling the light source such as a solid state diode laser 356 to the waveguide 340 can be accomplished by one of several methods, where the source generally is an integrated component of the magnetic slider 117. One coupling method is best seen in FIG. 5C, in which a grating coupler 360 consisting of grating lines 364 are formed on the surface 368 of the waveguide opposite to side facing the ABS. The source 356 is appropriately focused and set at an angle of incidence for best coupling. Alternatively, light can be directly butt-coupled into the end of the waveguide away from the cavity.

As is well understood by those skilled in the art, the initial process steps for fabricating a magnetic head are conducted upon the surface of a large wafer substrate. When all of the wafer stage process steps are completed, the wafer is sliced into a plurality of rows of magnetic heads, wherein the air bearing surface (ABS) of the magnetic heads in the row is exposed for further processing. In the prior art, the ABS processing steps generally include the polishing of the ABS surface down to a level at which the magnetic head components are desirably exposed at the ABS surface. In the present invention, the resonant cavity and waveguide are desirably fabricated during the row stage processing steps. Particularly, utilizing photolithographic techniques, an etching resist is deposited and patterned onto the ABS surface such that the resonant cavity and waveguide locations are exposed. Thereafter, utilizing a material removal process, such as an ion beam etching process or a reactive ion etch process, magnetic head material is removed from the ABS surface to create the resonant cavity and waveguide trenches. Thereafter, the trenches are filled, such as by ion beam or sputter deposition techniques with appropriate materials that comprise the dielectric material for the resonant cavity and waveguide. Thereafter, a capping surface material and an aperture are fabricated at the desired location for the resonant cavity.

In a second embodiment 400 of a magnetic head of the present invention, a cylindrical whispering gallery mode (WGM) cavity is placed between the recessed second magnetic pole tip and the ABS. FIGS. 6A, 6B and 6C depict the second embodiment 400 that includes the WGM optical resonant cavity media heating device, wherein FIG. 6A is a cross-sectional view, FIG. 6B is a plan view taken from the ABS, and FIG. 6C is a plan view from the downtrack side. As depicted therein, the magnetic head embodiment 400 includes a first magnetic shield layer 160, a read head sensor element 180 and a second magnetic shield layer 184, as well as the first magnetic pole 196, induction coil structure 200 within filling insulation 212, and writing magnetic pole 304 that are similar to the structures depicted in FIGS. 5A, 5B and 5C, and described above, whereby they are correspondingly numbered for ease of comprehension.

As is depicted in FIGS. 6A, 6B and 6C, the cavity is preferably disposed away from the ABS 142 and between the enlarged magnetic writing pole tip 306 and the ABS. The central axis of the post 416 is parallel to but offset from the central axis of the cylindrical cavity 408 as is best seen in FIG. 6B. In this respect the bulk of the body of the cavity 408 lies somewhat uptrack in the space between the writing pole tip 306 and the ABS 142. Alternatively, the bulk of the cavity body can be oriented somewhat in the downtrack direction between the writing pole and the ABS or to the side of the writing pole (such orientations are not shown herein). The exact location of the post 416 within the cavity 408 is carefully selected such that it is at the same radial location as an antinode of a resonant mode, and the end of the post tip 418 may extend from the cavity to the ABS. At resonance conditions at the input wavelength the WGM can provide very high electric fields normal to the face of the cavity at the post 416 as is discussed above. The output energy, with electric fields mainly normal to the ABS, can extend to and penetrate into the magnetic medium 150 to produce thermal heating. The size of the post 416 can affect the resonant behavior of the cavity, and the cavity design is post-geometry and post dimensions specific. This means the post dimensions can be designed to produce resonance for given cavity and required heated spot size. It is important to note that a change in bit density necessitates a change in post dimensions. In this respect, it is possible to rescale the cavity dimensions without loss of effectiveness in heating since the post defines the location of maximum electric field and the location of the heated spot. For the Si cavities and 1.55 µm wavelength case as discussed earlier, a 2 um diameter cavity would support approximately 20 maxima in a WGM mode with an axial electric field around the periphery. As before, a post tip 418 of about 50 nm×75 nm, for a 1 Tbit/in$^2$ application is easily compatible with the diameter of the cavity.

In an effort to enhance resonance, it is beneficial to fabricate the post from a metal such as silver, gold, aluminum, rhodium, platinum, chromium, among others. Similarly, the flat surfaces of the cavity may also have similar metal thin film.

In order to provide high efficiency coupling of light into the cavity 408, the optical waveguide 440 is placed in the vicinity of the cavity to provide the coupling. As is best seen in FIG. 6B, a waveguide 440 is illustrated on the uptrack side of the write pole 304. The construction of the waveguide and its coupling to the diode laser source 456 are similar to that depicted in FIGS. 5A, 5B and 5C described above. If the bulk of the body of the cavity 408 is on the down track side then the waveguide 440 needs to be on the down track side of the cavity (away from the post 416). The coupling of the light source 456 such as a solid state diode laser to the waveguide 440 is similar to that depicted in FIGS. 5A, 5B and 5C and described above.

In summary, this invention describes a mechanism for producing large electric fields in small localized areas (on the order of 20–30 nm across) on a recording medium. The invention describes how light can be efficiently conveyed from a source to the medium. It also describes how such a structure can be built and integrated with a magnetic recording head. The present invention also includes the use of a square, rectangular or polygonal cavity instead of a conventional circular one. A cavity with a straight boundary can provide better tunneling/coupling paths than one with a curved boundary, and comparable results will be obtained with such cavities.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What I claim is:

1. A magnetic head, comprising:
   a write head portion having a magnetic writing pole including a writing pole tip and an air bearing surface (ABS) thereof;
   an optical resonant cavity being disposed between said writing pole tip and said air bearing surface;
   said resonant cavity being adapted to emit optical near-field energy.

2. A magnetic head as described in claim 1 further including an optical energy source and an optical energy transmission means to couple optical energy from the source to said resonant cavity.

3. A magnetic head as described in claim 2 wherein said optical energy transmission means includes a waveguide that is disposed proximate said resonant cavity.

4. A magnetic head as described in claim 3 wherein said waveguide includes a tapered portion and a narrowed waveguide portion that is disposed proximate said resonant cavity.

5. A magnetic head as described in claim 1 wherein said resonant cavity includes a post for directing said optical energy from said resonant cavity.

6. A magnetic head as described in claim 5 wherein said post extends outwardly from said resonant cavity.

7. A magnetic head as described in claim 5 wherein said post is comprised of a metallic material.

8. A magnetic head as described in claim 5 wherein said wherein said resonant cavity is circular cylindrical in shape and said post is disposed along a central axis of said cavity.

9. A magnetic head as described in claim 5 wherein said post is disposed at a resonant antinode of optical energy within said resonant cavity.

10. A magnetic head as described in claim 5 wherein said post includes a post tip, and wherein the size of magnetic data bits that are written by said write head portion are determined by the size of said post tip.

11. A magnetic head as described in claim 10 wherein said post tip has a diameter that is formed with a subwavelength dimension compared to the wavelength of optical energy within said resonant cavity.

12. A magnetic head as described in claim 5 wherein an area of a magnetic disk that is exposed to a magnetic field from said writing pole tip is greater than an area of said magnetic disk that is heated by optical energy from said post of said resonant cavity.

13. A magnetic head as described in claim 5 wherein said resonant cavity is fabricated away from said ABS and said post extends to said ABS.

14. A magnetic head as described in claim 5 wherein said resonant cavity is comprised of a relatively high index of refraction material and said post is comprised of a metallic material.

15. A magnetic head as described in claim 1 wherein said writing pole tip has a tip area that is larger than the area of a face of said resonant cavity.

16. A magnetic head as described in claim 1 wherein said resonant cavity is sized for whispering gallery mode (WGM) resonance within said cavity at a laser wavelength.

17. A magnetic head as described in claim 1 wherein said resonant cavity is formed at said ABS.

18. A hard disk drive, comprising:
    at least one hard disk being fabricated for rotary motion upon a disk drive;
    at least one magnetic head adapted to fly over said hard disk for writing data on said hard disk, said magnetic head including:
    a write head portion having a magnetic writing pole including a writing pole tip and an air bearing surface thereof;
    an optical resonant cavity being disposed between said writing pole tip and said air bearing surface;
    said resonant cavity being adapted to emit optical near-field energy.

19. A hard disk drive as described in claim 18 further including an optical energy source and an optical energy transmission means to couple optical energy from the source to said resonant cavity.

20. A hard disk drive as described in claim 19 wherein said optical energy transmission means includes a waveguide that is disposed proximate said resonant cavity.

21. A hard disk drive as described in claim 20 wherein said waveguide includes a tapered portion and a narrowed waveguide portion that is disposed proximate said resonant cavity.

22. A hard disk drive as described in claim 18 wherein said resonant cavity includes a post for directing said optical energy from said resonant cavity.

23. A hard disk drive as described in claim 22 wherein said post extends outwardly from said resonant cavity.

24. A hard disk drive as described in claim 22 wherein said post is comprised of a metallic material.

25. A hard disk drive as described in claim 22 wherein said wherein said resonant cavity is circular cylindrical in shape and said post is disposed along a central axis of said cavity.

26. A hard disk drive as described in claim 22 wherein said post is disposed at a resonant antinode of optical energy within said resonant cavity.

27. A hard disk drive as described in claim 22 wherein said post includes a post tip, and wherein the size of magnetic data bits that are written by said write head portion are determined by the size of said post tip.

28. A hard disk drive as described in claim 27 wherein said post tip has a diameter that is formed with a subwavelength dimension compared to the wavelength of optical energy within said resonant cavity.

29. A hard disk drive as described in claim 22 wherein an area of a magnetic disk that is exposed to a magnetic field from said writing pole tip is greater than an area of said magnetic disk that is heated by optical energy from said post of said resonant cavity.

30. A hard disk drive as described in claim 22 wherein said resonant cavity is comprised of a relatively high index of the refraction material and said post is comprised of a metallic material.

31. A hard disk drive as described in claim 18 wherein said writing pole tip has a tip area that is larger than the area of a face of said resonant cavity.

32. A hard disk drive as described in claim 18 wherein said resonant cavity is fabricated away from said ABS and said post extends to said ABS.

33. A hard disk drive as described in claim 18 wherein said resonant cavity is sized for WGM resonance within said cavity at a laser wavelength.

34. A hard disk drive as described in claim 18 wherein said resonant cavity is formed at said ABS.

35. A hard disk drive as described in claim 18 wherein said hard disk includes a soft magnetic underlayer.

* * * * *